May 13, 1969     O. BIHLMAIER     3,443,497
CAMERA HAVING STRUCTURE FOR MAKING FLASH EXPOSURES
Filed Nov. 2, 1966
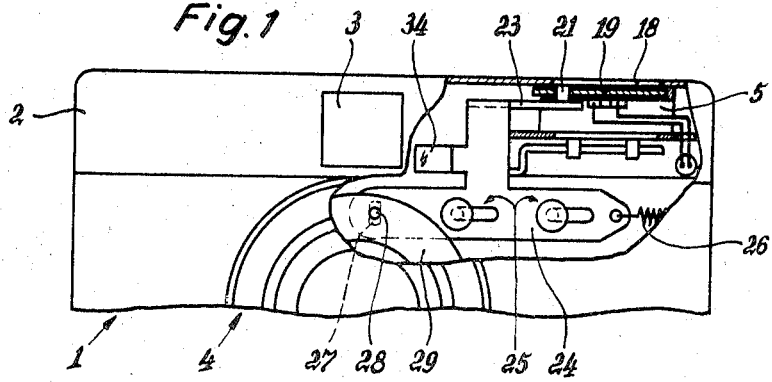
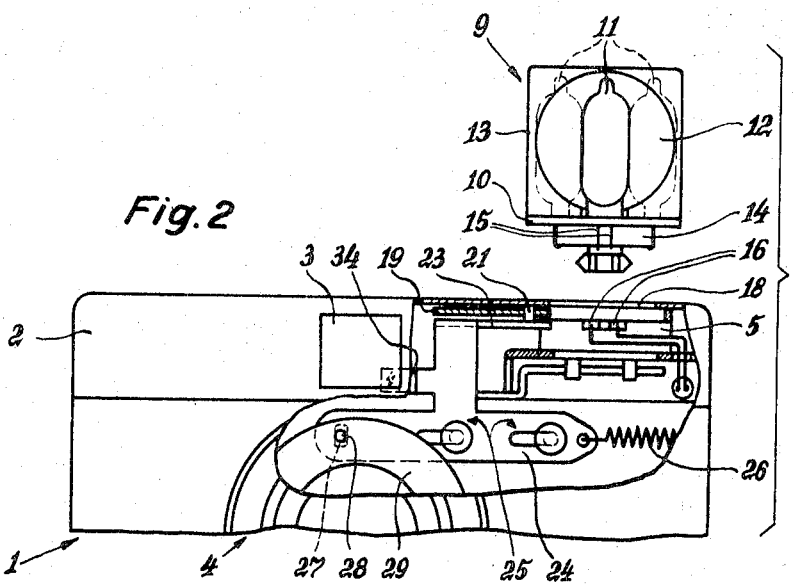
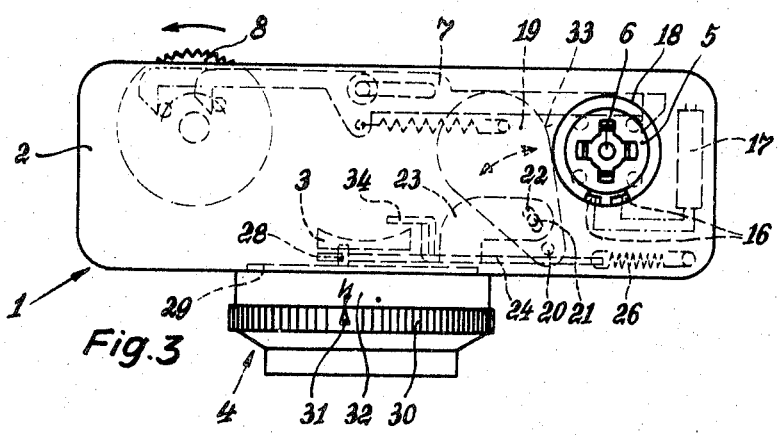

United States Patent Office 3,443,497
Patented May 13, 1969

3,443,497
CAMERA HAVING STRUCTURE FOR MAKING FLASH EXPOSURES

Oskar Bihlmaier, Braunschweig, Germany, assignor to Voigtlander A.G., Braunschweig, Germany
Filed Nov. 2, 1966, Ser. No. 591,567
Claims priority, application Germany, Nov. 12, 1965, V 18,236
Int. Cl. G03b *19/04*
U.S. Cl. 95—11                6 Claims

ABSTRACT OF THE DISCLOSURE

A camera having a holder for receiving flashcubes for making flash exposures. A cover carried by the camera body is movable between a closed and an open position. A slide member couples the cover to the camera exposure time setting device to provide the proper exposure time setting for flash exposures when the cover is moved to the open position.

---

The present invention relates to cameras.

In particular, the present invention relates to cameras which have structure for making flash exposures.

The present invention relates in particular to that type of camera which is provided with a holder for receiving a cube-shaped body which when purchased carries a plurality of flashlamps ready for use with a plurality of reflectors respectively situated behind the flashlamps, these flashlamps, when the cube-shaped body is set into the holder of the camera provided therefor, being electrically connected on the one hand with contacts in the camera and on the other hand with contacts carried by the cube-shaped body in such a way that the flashlamps are successively connected with a source of electrical energy and an igniting device, so as to make successive exposures.

With known cameras of this type, the holder which receives the cube-shaped body is at all times freely accessible from the exterior. When there is no cube-shaped body in the holder there is the possibility that the holder will become damaged or soiled.

One of the objects of the present invention is to provide a covering means which will close off the holder means from the exterior when there is no cube-shaped body therein and which at the same time will be capable of opening the holder means so that it can then receive the cube-shaped body.

This cover means, which can take the form of a shiftable slide member, a tiltable flap member, or a swingable plate or the like, can, in accordance with a further object of the present invention, according to the simplest construction thereof, simply be provided with a manually engageable member capable of being actuated by the operator for displacing the cover means between its open and closed positions.

According to a further object of the present invention, a means is provided for urging the cover means to its closed position, and this latter means can advantageously take the form of a suitable spring.

However, according to a preferred embodiment of the present invention, it is yet another object to provide a coupling means which will couple the cover means to an exposure time setting means which is connected to the camera shutter, the coupling means providing for displacement of the cover means to its open position when the exposure time setting means sets into the camera an exposure time suitable for flash exposures, such as an exposure time of 1/30 sec., for example. This coupling means can be constructed in such a way that by displacing the cover means the exposure time setting means will be situated in positions corresponding to that of the cover means such as, for example, in the position providing for an exposure of 1/30 sec. when the cover means has its open position enabling the cube-shaped body, hereafter referred to as a flashcube, to be introduced into the holder means.

It is, however, an important object of the present invention to provide a structure where the exposure time setting means functions not only to set the exposure time but also as a manually operable member for controlling the position of the cover means. Thus, when the exposure time setting means is displaced from a position providing exposure times suitable for daylight exposures to a position providing an exposure time suitable for flash exposures, the cover means is simultaneously displaced from its closed position closing the holder for the flashcube to its open position permitting the flashcube to be introduced into the holder means provided therefor, so that whenever the exposure time setting means provides an exposure suitable for flash exposures the operator can without further manipulations introduce a flashcube into the holder means.

The invention is illustrated by way of example in the accompanying drawings which form part of this application and in which:

FIG. 1 is a fragmentary, schematic, partly broken away and partly sectional front elevation showing that part of a camera which is provided with the structure of the present invention;

FIG. 2 shows the structure of FIG. 1 when it has a position ready to receive a flashcube; and FIG. 3 is a top plan view of the camera of FIG. 2.

Referring now to the drawings, the camera 1 illustrated therein has a camera body part of which is formed by a hollow cap member 2 mounted in a well known manner on the top wall of the camera housing and defining with this top wall a chamber which is adapted to receive structure such as the viewfinder means 3 schematically illustrated in the drawings. The camera body also carries an objective-holding unit 4 which is structurally united with the shutter of the camera.

Within the hollow cap 2 of the camera body is a holder means 5, which is built into the camera and which is supported for rotary movement about a central shaft 6, which is centrally positioned with respect to the holder means 5, this shaft 6 being shown in FIG. 3. An elongated slide member 7, shown in dotted lines in FIG. 3, serves to couple the holder means 5 with the film-advancing disc 8 which has a knurled periphery projecting at the rear of the camera and accessible to the operator to be turned in the direction of the arrow shown in FIG. 3 for advancing the film after each exposure. A spring shown in dotted lines connected with the slide member 7 urges the latter to the right, as viewed in FIG. 3, while a pin carried by the disc 8 coacts with a lug at the left end of the slide member 7 to urge the latter to the left in opposition to the spring connected thereto during turning of the disc 8 when the film is advanced. The pin of the disc 8 will simply ride off the lug or extension at the left end of the slide member 7 to permit the spring connected thereto to return it to its right end position, as viewed in FIG. 3, and at its right end this slide member 7 carries a springy yieldable lug which rides over pins carried by the holder 5 for successively engaging these pins so as to turn the holder 5 at each actuation of the disc 8 by the operator to advance the film by one film frame. As may be seen from FIG. 3, the holder 5 has four pins displaced from each other by 90° about the shaft 6 and also shown in dotted lines in FIG. 3, the slide 7 successively engaging these pins of the holder 5 so as to displace the holder through 90° when the film is advanced to situate the next frame in a position for exposure.

The holder means 5 is adapted to receive the flashcube 9 which is shown in FIG. 2. This flashcube has a cube-shaped housing adapted to accommodate four flashlamps 11 in a base 10, these flashlamps being respectively situated in front of reflectors 12 which are respectively directed toward the four sides of the flashcube. The lamps together with their reflectors are covered by a clear, transparent enclosure 13 which is fixed to the base 10. At the lower side of the base 10 is a slip ring 14 which is carried by the base 10 and which carries four pairs of conductors 15 respectively provided for the four flashlamps. The camera body carries a pair of contact springs 16 which are situated so as to be placed in engagement with the successive pairs of conductors 15 as the flashcube 9 is turned to situate the successive lamps 11 thereof in a forwardly-directed picture-taking position, so that whenever an unignited flashlamp is in the picture-taking position thereof the pair of conductors 15 connected thereto are in engagement with the pair of contact springs 16, respectively. These contact springs 16 are connected to the built-in camera structure 17 which provides a source of electrical energy and which includes the igniting device for igniting the flashlamps, so that when the camera shutter is actuated to make an exposure the particular flashlamp whose conductors 15 engage the contacts 16 will be ignited to make the flash exposure. When the film is then advanced to situate the next frame in a position for exposure, the holder means 5 together with the flashcube 9 are turned through an angle of 90°, so that another flashlamp 11 is displaced into a position where it is ready for the next flash exposure.

The holder means 5 is formed with an opening 18 which is situated at the exterior of the camera body and which is shown as taking the form of an opening 18 passing through the top wall of the cap 2, so that through this opening 18 access may be had to the holder means 5. In order that this opening 18 does not constantly remain uncovered but instead is only accessible for introduction and use of a flashcube 9, a cover means is provided for covering and uncovering the opening 18 of the holder means. This cover means is carried by the camera body for movement between an open position uncovering the opening 18 when the cover means is displaced therefrom and a closed position closing the covering 18. The illustrated cover means takes the form of a plate 19 which is pivotally connected to the camera body by a pivot pin 20 so that it is capable of swinging back and forth between closed and open positions, as shown by the double-headed arrow in FIG. 3 which also shows the picot pin 20 carried by the top wall of the cap 2 and providing a pivotal support for the closure plate 19 which is shown in its open position in FIG. 3. The plate 19 is shown in its closed position in FIG. 1 and is also shown in its open position in FIG. 2.

As was mentioned above, in order to displace the cover means 19 between its closed and open positions it is possible to provide a manually accessible knob or the like which can be engaged by the operator for manually displacing the plate 19 between its closed and open positions. However, if this were done a special hand grip would have to be provided for displacing the plate 19. In order to avoid the requirement of such a special hand grip, the following structure is described for displacing the cover means 19 between its positions.

The cover means 19 fixedly carries an adjusting pin 21 which is received in a slot 22 which is formed in an arm 23 of a shiftable means formed by a slide member 24. A pin-and-slot means 25 shown in FIGS. 1 and 2 is carried by the camera body and guides the slide member 24 for movement to the left and right to the positions shown in FIGS. 1 and 2.

A spring means is provided for urging the cover means 19 to its closed position, and in the illustrated example this spring means takes the form of a tension spring 26 connected at one end to the camera body in the interior thereof and at its opposite end to the slide member 24 so as to urge the latter to the right position thereof shown in FIG. 1. In this position the slot 22 coacts with the pin 21 for holding the plate 19 in its closed position extending across and closing the opening 18.

The slide member 24, which forms the shiftable means, is formed with a further slot 27 (FIG. 2) which receives an adjusting pin 28 which is fixed to the exposure time setting means 29 which is schematically illustrated in FIG. 2 and which includes a suitable rotary ring which carries the pin 28 and which is connected either directly or indirectly with an exterior exposure time setting ring 30 of the unit 4. This ring 30 of the exposure time setting means carries an index 31 capable of coacting with at least a pair of stationary markings 32 situated at the exterior of the unit 4. The connection between the exposure time setting means 29, 30 and the shiftable means 24 is such that the spring means 26 urges the shiftable means 24 to the position of FIG. 1 where the shiftable means 24 situates the exposure time setting means in a position suitable for providing an exposure where there is sufficient daylight illumination, such as, for example, in a position providing an exposure time of $\frac{1}{125}$ sec. In this position the opening 18 is closed and a flashcube cannot be introduced into the camera at this time.

It is generally suitable to provide for flash exposures a different, completely predetermined exposure time such as an exposure time of $\frac{1}{30}$ sec. By turning the ring 30 so as to situate the index 31 in alignment with the flash symbol of the pair of markings 32, as shown in FIG. 3, the exposure time setting means provides an exposure time suitable for flash exposures, and at the same time the pin 28 coacts with the shiftable means 24 to displace the latter in opposition to the spring 26 into the position of FIG. 2 where the slide member 24 by acting on the pin 21 situates the plate 19 in its open position displaced from the opening 18 so that the latter is now uncovered and a flashcube can be introduced. After the flashcube is introduced into holder means 5 the operator will release the ring 30, but the spring 26 will not be capable of returning the slide member 24, the ring 30, and the plate 19 into the positions thereof shown in FIG. 1 because the edge 33 of the plate 19 (FIG. 3) comes into engagement with the slip ring 14 (FIG. 2) of the flashcube 9.

An indicating means is provided for indicating to the operator whether or not the structure is in the position of FIG. 1 or that of FIG. 2, and this indicating means takes the form of a lug 34 fixed to and extending from the slide member 24 and extending into the viewfinder means 3 when the camera structure is in a position for making flash exposures, as shown in FIG. 2. This lug 34 can carry any transparent plate, for example, of a suitable color through which the light passes so as to indicate by this color to the operator that the parts are in the position of FIG. 2. Thus, the indicating means 34 may take the form of a flash symbol such as that shown in FIG. 3 mounted on a suitable transparent base. As may be seen from FIG. 1 when the parts are in the position where the opening 18 is closed the indicating means 34 is not visible in the viewfinder.

When the flashcube 9 is removed from the holder means 5, the spring 26 returns the shiftable means 24, the plate 19, and the ring 30 to the positions thereof shown in FIG. 1. In this way an exposure time suitable for daylight exposures is automatically introduced into the camera and furthermore the opening 18 is closed.

It is also within the scope of the present invention to couple the cover means to the exposure time setting means in such a way that by adjusting the cover means the exposure time setting means will be placed in its different positions.

What is claimed is:

1. In a camera, a camera body having an outer surface, holder means carried by said camera body for removably holding a flashcube which coacts with structure carried by said camera body for making a series of flash exposures, said holder means being formed with an opening situated at said outer surface of said camera body and through which the flashcube is introduced into and removed from said holder means, and cover means carried by said camera body for movement between a closed position closing said opening and an open position displaced from said opening so that a flashcube can then be introduced into said holder means and an exposure time setting means carried by said camera body, and coupling means coupling said cover means to said exposure setting means for displacing said cover means to said open position thereof when said exposure time setting means sets an exposure time suitable for flash exposures.

2. The combination of claim 1 and wherein said coupling means transmits movement of said exposure time setting means to said cover means for displacing the latter between its open and closed positions in response to actuation of said exposure time setting means.

3. In a camera, a camera body having an outer surface, holder means carried by said camera body for removably holding a flashcube which coacts with structure carried by said camera body for making a series of flash exposures, said holder means being formed with an opening situated at said outer surface of said camera body and through which the flashcube is introduced into and removed from said holder means, and cover means carried by said camera body for movement between a closed position closing said opening and an open position displaced from said opening so that a flashcube can then be introduced into said holder means and a viewfinder means carried by said camera body, and indicating means operatively connected with said cover means for making visible in said viewfinder means whether said cover means is in said open or in said closed positions thereof.

4. In a camera, a camera body having an outer surface, holder means carried by said camera body for removably holding a flashcube which coacts with structure carried by said camera body for making a series of flash exposures, said holder means being formed with an opening situated at said outer surface of said camera body and through which the flashcube is introduced into and removed from said holder means, and cover means carried by said camera body for movement between a closed position closing said opening an open position displaced from said opening so that a flashcube can then be introduced into said holder means and a plate pivotally connected to said camera body turnably carried by said camera body in the interior thereof in the region of said opening for movement between said portions, said camera body carrying an exposure time setting means, and shiftable coupling means connected on the one hand to said exposure time setting means and on the other hand to said plate for turning the latter between said closed and open positions of said cover means in response to actuation of said exposure time setting means.

5. In a camera, a camera body having an outer surface, holder means carried by said camera body for removably holding a flashcube which coacts with structure carried by said camera body for making a series of flash exposures, said holder means being formed with an opening situated at said outer surface of said camera body and through which the flashcube is introduced into and removed from said holder means, and cover means carried by said camera body for movement between a closed position closing said opening an open position displaced from said opening so that a flashcube can then be introduced into said holder means and a plate pivotally connected to said camera body turnably carried by said camera body in the interior thereof in the region of said opening for movement between said portions said camera body carrying an exposure time setting means, and shiftable coupling means connected on the one hand to said exposure time setting means and on the other hand to said plate for turning the latter between said closed and open positions of said cover means in response to actuation of said exposure time setting means and wherein a spring means is connected to one of the three means constituted by said cover means, said coupling means, and said exposure time setting means, for urging said cover means to said closed position thereof and for urging said exposure time setting means to a position suitable for providing daylight exposures, said holder means when it accommodates a flashcube providing for the flashcube a position there the flashcube itself maintains said cover means in its open position and said exposure time setting means in a position suitable for flash exposures, in opposition to said spring means, said cover means having said plate thereof then in engagement with part of the flashcube so as to be prevented thereby from being displaced by said spring means to said closed position.

6. In a camera, a camera body having an outer surface, holder means carried by said camera body for removably holding a flashcube which coacts with structure carried by said camera body for making a series of flash exposures, said holder means being formed with an opening situated at said outer surface of said camera body and through which the flashcube is introduced into and removed from said holder means, and cover means carried by said camera body for movement between a closed position closing said opening and an open position displaced from said opening so that a flashcube can then be introduced into said holder means and wherein a shifting means is operatively connected with said cover means for displacing the latter between said positions thereof, viewfinder means carried by said camera body, and indicating means carried by said shifting means and extending into said viewfinder means to be visible therein when said shifting means displaces said cover means to said open position thereof.

References Cited
UNITED STATES PATENTS

| | | | |
|---|---|---|---|
| 3,051,066 | 8/1962 | Lareau et al. | 95—11.5 |
| 3,175,479 | 3/1965 | Beach et al. | 95—11 |
| 3,353,463 | 11/1967 | Horton et al. | 95—11 |

NORTON ANSHER, *Primary Examiner.*

CHARLES E. SMITH, *Assistant Examiner.*

U.S. Cl. X.R.

240—1.3